United States Patent
Crall et al.

(10) Patent No.: US 11,149,584 B2
(45) Date of Patent: Oct. 19, 2021

(54) CONTAINMENT CASE HAVING CERAMIC COATED FIBERS

(71) Applicant: General Electric Company, Schenectady, NY (US)

(72) Inventors: David William Crall, Loveland, OH (US); Nicholas Joseph Kray, Mason, OH (US); Scott Roger Finn, Montgomery, OH (US); Wendy Wenling Lin, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 50 days.

(21) Appl. No.: 16/594,208

(22) Filed: Oct. 7, 2019

(65) Prior Publication Data

US 2021/0102475 A1 Apr. 8, 2021

(51) Int. Cl.
*F01D 21/04* (2006.01)

(52) U.S. Cl.
CPC ........ *F01D 21/045* (2013.01); *F05D 2220/32* (2013.01); *F05D 2220/36* (2013.01); *F05D 2230/90* (2013.01); *F05D 2300/614* (2013.01)

(58) Field of Classification Search
CPC .......... F01D 21/045; F01D 25/26; F02C 7/05; F04D 29/526; D04H 1/4342; B32B 5/14; B32B 5/142; B32B 5/145; B32B 5/147
See application file for complete search history.

(56) References Cited

U.S. PATENT DOCUMENTS

| 3,573,123 | A | | 3/1971 | Siegel et al. | |
|---|---|---|---|---|---|
| 4,752,503 | A | * | 6/1988 | Thebault | C04B 35/80 427/248.1 |
| 5,187,021 | A | * | 2/1993 | Vydra | C04B 35/62855 428/607 |
| 5,502,142 | A | * | 3/1996 | Sneddon | C04B 35/583 423/279 |
| 5,776,839 | A | * | 7/1998 | Dischler | D06M 23/08 442/239 |
| 5,880,042 | A | * | 3/1999 | Schuster | B32B 5/024 442/134 |
| 6,053,696 | A | * | 4/2000 | Roberts | F01D 21/045 415/9 |
| 6,059,524 | A | | 5/2000 | Costa et al. | |
| 7,713,021 | B2 | | 5/2010 | Finn et al. | |

(Continued)

*Primary Examiner* — Igor Kershteyn
*Assistant Examiner* — Topaz L. Elliott
(74) *Attorney, Agent, or Firm* — Dority & Manning, P.A.

(57) ABSTRACT

Containment assemblies and methods for forming containment assemblies of gas turbine engines are provided. For example, a containment assembly comprises a containment case including a plurality of coated fibers. Each coated fiber comprises a fiber surrounded by a ceramic material such that the ceramic material coats the fiber. As another example, a containment assembly comprises an inner case and a containment case comprising a plurality of coated fibers. Each coated fiber comprises a fiber surrounded by a ceramic material such that the ceramic material coats the fiber. The containment case includes a greater proportion of the coated fibers at an inner surface of a layer of the containment case than at a location within the containment case that is radially outward from the inner surface. Methods for forming a containment assembly of a gas turbine engine are provided.

18 Claims, 8 Drawing Sheets

(56) References Cited

U.S. PATENT DOCUMENTS

| | | | |
|---|---|---|---|
| 8,333,558 B2 | 12/2012 | Finn et al. | |
| 8,425,178 B2 | 4/2013 | Lenk | |
| 8,652,570 B2 | 2/2014 | Arvidson et al. | |
| 8,757,958 B2 * | 6/2014 | Lussier | F01D 21/045 415/9 |
| 9,017,814 B2 | 4/2015 | Xie et al. | |
| 9,249,530 B2 | 2/2016 | Yoon et al. | |
| 9,828,876 B2 | 11/2017 | Kappes | |
| 9,945,254 B2 | 4/2018 | Ivakitch et al. | |
| 10,316,682 B2 * | 6/2019 | Vetters | C04B 35/01 |
| 2008/0145215 A1 * | 6/2008 | Finn | F01D 21/045 415/200 |
| 2010/0077721 A1 * | 4/2010 | Marshall | F01D 21/045 60/39.091 |
| 2011/0052383 A1 * | 3/2011 | Lussier | F01D 21/045 415/200 |
| 2013/0153456 A1 * | 6/2013 | Zhu | F01D 25/24 206/521 |
| 2014/0119904 A1 * | 5/2014 | Jalowka | B29C 70/36 415/182.1 |
| 2015/0004393 A1 * | 1/2015 | Pegna | C04B 35/62865 428/311.51 |
| 2016/0032776 A1 * | 2/2016 | Voleti | F02C 7/32 415/200 |
| 2016/0333718 A1 * | 11/2016 | Vetters | C04B 35/803 |
| 2019/0017445 A1 | 1/2019 | Adams et al. | |
| 2020/0040909 A1 * | 2/2020 | Jain | F01D 21/045 |

\* cited by examiner

CONTAINMENT CASE HAVING CERAMIC COATED FIBERS

FIELD

The present subject matter relates generally to components formed from composite materials. More particularly, the present subject matter relates to casings formed with ceramic coated fibers, such as fan case containment systems of gas turbine engines.

BACKGROUND

Aircraft gas turbine engines operate in various conditions and foreign objects may be ingested into the engine. During operation of the engine and, in particular, during movement of an aircraft powered by the engine, the fan blades may be impacted and damaged by foreign objects such as birds or debris picked up on a runway. Impacts on the fan blades may damage the blades and result in blade fragments or entire blades being dislodged and flying radially outward at relatively high velocity. Catastrophic damage can occur to the aircraft and its occupants if a broken fan blade is propelled radially outwardly from the rotating hub under centrifugal force and impacts on the aircraft fuselage.

To limit or minimize damage from dislodged blades or blade fragments, some known engines include a metallic or composite casing or shell to facilitate increasing a radial and an axial stiffness of the engine and to facilitate reducing stresses near the engine casing penetration. To provide blade containment, most of the kinetic energy from a released blade or blade fragment must be absorbed by the casing or shell material. For smaller diameter engines, adequate containment capability may be achieved with a metallic "hardwall" case thick enough to resist penetration by blade fragments. A layer of composite material, such as a graphite epoxy polymer matrix composite, may be applied to the outer surface of the metallic case to bolster the containment ability of the case. Thus, hardwall containment cases increase a radial and an axial stiffness of the engine and facilitate reducing stresses near the engine casing penetration to help contain dislodged blades or blade fragments.

However, for larger diameter engines, a metallic case thick enough to resist penetration is prohibitively heavy. Therefore, either composite hardwall systems (which utilize a composite case rather than a metallic case) or composite "softwall" containment systems may be used for larger diameter engines. In a softwall system, a lightweight, high strength ballistic fabric, such as a fabric formed from aromatic polyamide fibers (e.g., Kevlar®), may be wrapped in multiple layers around a relatively thin support structure. In operation, a separated blade or blade fragment locally penetrates the support structure and strikes the fabric. The fabric layers are intended to capture and contain the blade or blade fragment. Conventional support structures may be fabricated of aluminum or fiber-reinforced composites based on weight considerations, e.g., the support structure may include aluminum honeycomb structures.

Thus, typical hardwall and softwall containment systems each use fibers (e.g., graphite, Kevlar®) to provide fan blade containment. These fibers are very strong in the tensile direction; most case materials such as aluminum or graphite-epoxy excel at absorbing energy from a diffuse blade impact, and composite materials are effective at absorbing diffuse energy by directing loads in the axis of their fibers or by separating from their matrix. Further, metallic materials are efficient at absorbing diffuse energy by plastic strain of the case. Nonetheless, the ability of typical hardwall and softwall containment systems to carry a load can be significantly degraded by the shearing or cutting action of a sharp object, i.e., metallic materials and composite fibers are susceptible to premature failure by cutting from sharp objects. For example, composite fan blades may have metal leading edges that can cut the fibers and, thus, require increased composite thickness in the case. Fans with solid titanium blades also are prone to fiber cutting. In typical hardwall or softwall containment systems, up to 50% of the fibers in areas impacted with a sharp projectile can fail prematurely by cutting. As one example, the Kevlar® wraps in a softwall containment system can fail from shear or fraying after the Kevlar® fibers are cut by a sharp object, and in testing, 40% of the Kevlar® in a single fiber tow failed from shear/fraying. Attempts to avoid defeating typical containment systems include increasing the thickness of the case material, e.g., in the area adjacent the metal leading edge of the fan blades, by using more metal, graphite epoxy material, or more Kevlar® wraps to provide containment of a sharp object. However, increasing the amount of containment system material can increase engine weight and cost.

Accordingly, improved containment casings or shells for gas turbine engines would be desirable. For instance, increasing the shear strength of fibers used in hardwall and softwall containment assemblies would be desirable.

BRIEF DESCRIPTION

Aspects and advantages of the invention will be set forth in part in the following description, or may be obvious from the description, or may be learned through practice of the invention.

In one exemplary embodiment of the present subject matter, a containment assembly of a gas turbine engine is provided. The containment assembly comprises a containment case including a plurality of coated fibers. Each coated fiber comprises a fiber surrounded by a ceramic material such that the ceramic material coats the fiber.

In another exemplary embodiment of the present subject matter, a containment assembly of a gas turbine engine is provided. The containment assembly comprises an inner case and a containment case comprising a plurality of coated fibers. Each coated fiber comprises a fiber surrounded by a ceramic material such that the ceramic material coats the fiber. The containment case includes a greater proportion of the coated fibers at an inner surface of a layer of the containment case than at a location within the containment case that is radially outward from the inner surface.

In a further exemplary embodiment of the present subject matter, a method for forming a containment assembly of a gas turbine engine is provided. The method comprises coating each fiber of a plurality of fibers with a ceramic material such that the ceramic material surrounds each fiber of the plurality of fibers to form a plurality of coated fibers; forming a containment case using the plurality of coated fibers; and disposing the containment case about a plurality of fan blades of the gas turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present subject matter provides fan containment case assemblies having fibers that are individually coated with a material, e.g., a hard ceramic material such as tungsten carbide, aluminum oxide, or titanium dioxide, to protect the fiber from cutting or shearing, e.g., from the cutting action of a released blade during a fan blade-out event in a gas turbine engine. The coated fibers may be used, e.g., in hardwall fan cases, softwall fan cases, and fan inlets. The coated fibers may be used alone, or in combination with uncoated fibers, to form plies or preforms used to form a containment case, such as a fan case or a containment belt, of the fan containment case assembly. The plies or preforms may be "dry" (e.g., coated fibers or a combination of coated and uncoated fibers woven into a fabric) or impregnated with a matrix material to form a composite material. Moreover, because individual fibers are coated with the material, the containment case can be functionally graded, optimizing the ratio of coated fibers to uncoated fibers throughout the containment case, or at least a layer of the containment case in which the coated fibers are used. Methods for forming fan containment case assemblies also are provided.

Figure 1:
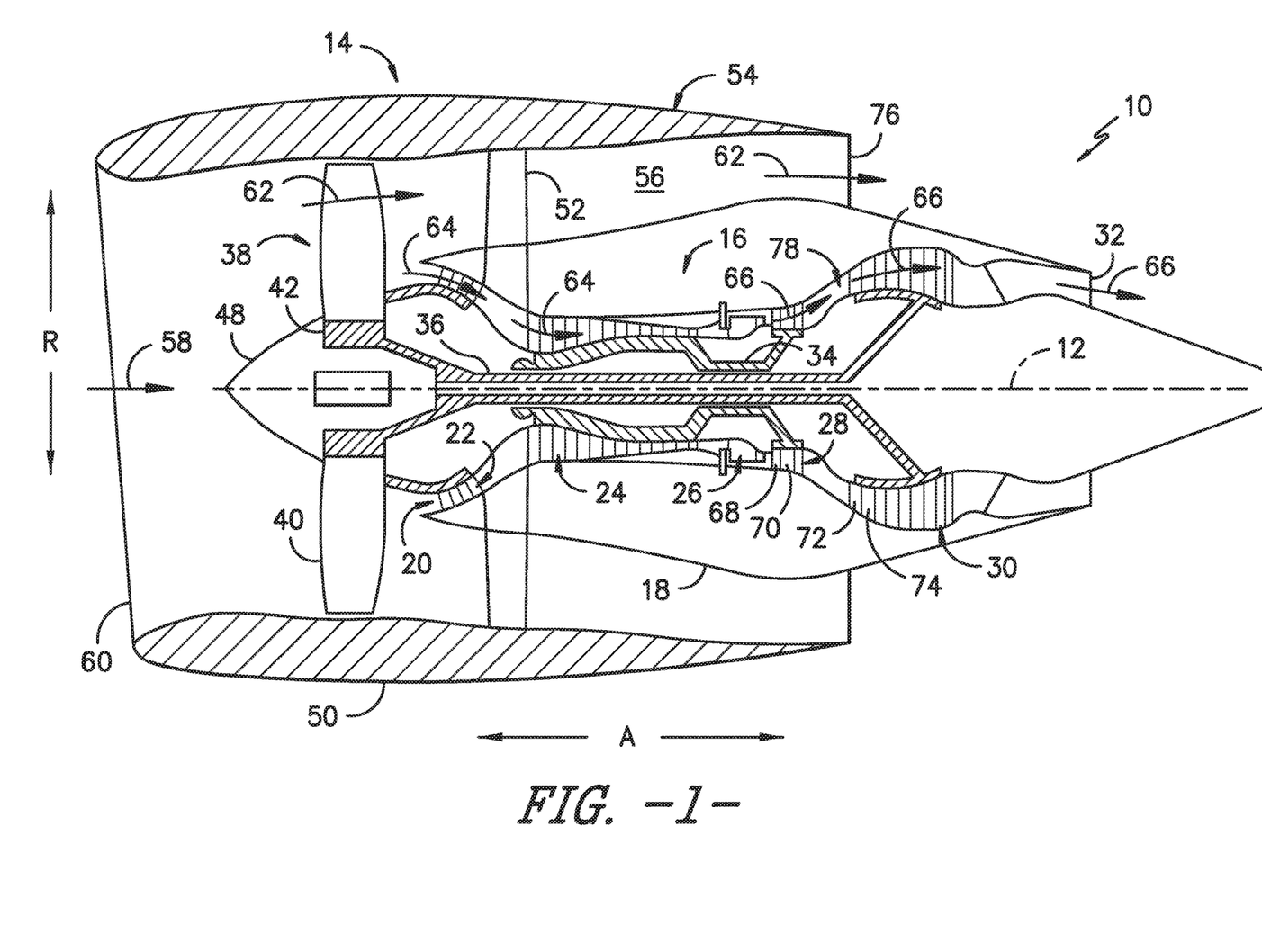
FIG. 1 provides a schematic cross-section view of an exemplary gas turbine engine according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal centerline 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that fan case (nacelle) 50 may be configured to be supported relative to the core turbine engine 16 by a plurality of circumferentially-spaced outlet guide vanes 52. Moreover, a downstream section 54 of the fan case 50 may extend over an outer portion of the core turbine engine 16 so as to define a bypass airflow passage 56 therebetween.

During operation of the turbofan engine 10, a volume of air 58 enters turbofan 10 through an associated inlet 60 of the fan case 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of the turbofan engine 10 may comprise a composite material, such as a polymer matrix composite (PMC) material or a ceramic matrix composite (CMC) material, which has high temperature capability. Composite materials generally comprise a fibrous reinforcement material embedded in matrix material, e.g., a polymer or ceramic matrix material. The reinforcement material serves as a load-bearing constituent of the composite material, while the matrix of a composite material serves to bind the fibers together and act as the medium by which an externally applied stress is transmitted and distributed to the fibers.

PMC materials are typically fabricated by impregnating a fabric or unidirectional tape with a resin (prepreg), followed by curing. Prior to impregnation, the fabric may be referred to as a "dry" fabric and typically comprises a stack of two or more fiber layers (plies). The fiber layers may be formed of a variety of materials, nonlimiting examples of which include carbon (e.g., graphite), glass (e.g., fiberglass), polymer (e.g., Kevlar®) fibers, and metal fibers. Fibrous reinforcement materials can be used in the form of relatively short chopped fibers, generally less than two inches in length, and more preferably less than one inch, or long continuous fibers, the latter of which are often used to produce a woven fabric or unidirectional tape. PMC materials can be produced by dispersing dry fibers into a mold, and then flowing matrix material around the reinforcement fibers, or by using prepreg. For example, multiple layers of prepreg may be stacked to the proper thickness and orientation for the part, and then the resin may be cured and solidified to render a fiber reinforced composite part. Resins for PMC matrix materials can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high performance thermoplastic resins that have been contemplated for use in aerospace applications include polyetheretherketone (PEEK), polyetherketoneketone (PEKK), polyetherimide (PEI), and polyphenylene sulfide (PPS). In contrast, once fully cured into a hard rigid solid, thermoset resins do not undergo significant softening when heated but, instead, thermally decompose when sufficiently heated. Notable examples of thermoset resins include epoxy, bismaleimide (BMI), and polyimide resins.

In some embodiments, the "dry" fabric (i.e., an unimpregnated fabric) may be used as one or more layers of a component of the turbofan engine 10. For instance, a fabric may be formed from fibers of carbon, glass, polymer, and/or metal as described above. Without impregnating the fabric with a resin, layers of the fabric may be wrapped about other segments of the component, e.g., to impart certain characteristics to the component due to the fibers used to form the fabric.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAIV-IC®), alumina silicates (e.g., 3M's Nextel 440 and 480), and chopped whiskers and fibers (e.g., 3M's Nextel 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

As described in greater detail herein, the fan section 14 of the engine 10 includes a fan containment case assembly that includes the fan case 50 and that circumscribes and surrounds the fan 38 and the fan blades 40 to retain any fan blades 40 or fan blade fragments dislodged from the engine fan 38. A "blade-out event" or a fan blade-out (FBO) event arises when a fan blade or portion thereof is accidentally released from a rotor of a high-bypass turbofan engine. When suddenly released during flight, a fan blade can impact a surrounding fan case with substantial force, sometimes penetrating the fan case and travelling into the fan containment case assembly.

Typical fan containment case assemblies are of two primary types: "hardwall" systems and "softwall" systems. Hardwall systems include an annular containment case manufactured from a high strength material with an adequate shell thickness to absorb the kinetic energy of an impacting fan blade. The hardwall system is a rigid structure, and as such, the shell may be formed from a composite material, e.g., a PMC material consisting of carbon (e.g., graphite) fibers and epoxy resin or a metallic material. Extra shell material may be applied to the high strength material, e.g., to contain a metal leading edge of a fan blade and/or in the root impact zone, which has the maximum energy of the impacting fan blade. For instance, a layer of composite material, such as a PMC material, may be applied to the outer surface of a metallic shell as extra shell material.

Softwall systems employ nesting areas defined by inner and outer annular shells having honeycomb or other suitable structures disposed therein. In addition, ballistic material, such as an aromatic polyamide fiber (e.g., Kevlar®), may be wrapped around the case structure. Blade fragments are captured within the system and prevented from further contact with other fan blades. More particularly, the ballistic material utilizes "dry" fibers, i.e., fibers not embedded in a matrix, to contain blades or blade fragments in a manner similar to catching the projectiles in a net. Hardwall and softwall systems also may be combined.

Figure 2A:
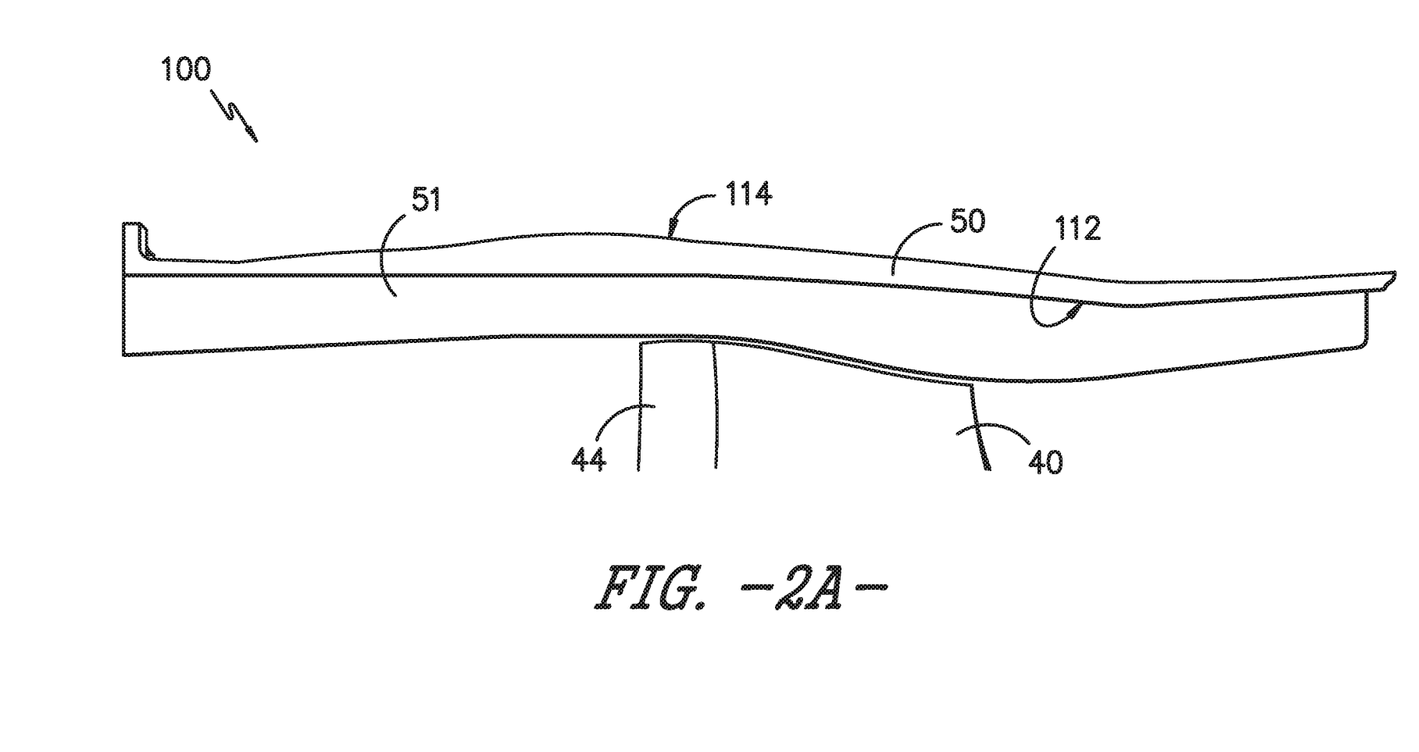
FIG. 2A provides a schematic cross-section view of a hardwall fan containment case assembly according to an exemplary embodiment of the present subject matter.

Referring to FIG. 2A, a hardwall fan containment case assembly 100 is shown according to an exemplary embodiment of the present subject matter. The fan containment case assembly 100 includes the fan case 50, which is disposed about the longitudinal centerline 12 (FIG. 1), and may include panels 51 on the interior of the fan case 50 that improve acoustic and blade rub characteristics. As previously described, the fan case 50 is the shell of the hardwall containment system and may be formed from a composite material, such as a PMC material. As such, the fan case 50 forms a radially outermost portion of the fan containment case assembly 100, helping contain objects travelling outward from within the panels 51 from continuing to travel beyond the fan section 14. Accordingly, for hardwall containment assemblies, the fan case 50 also may be referred to as a containment case.

Figure 2B:
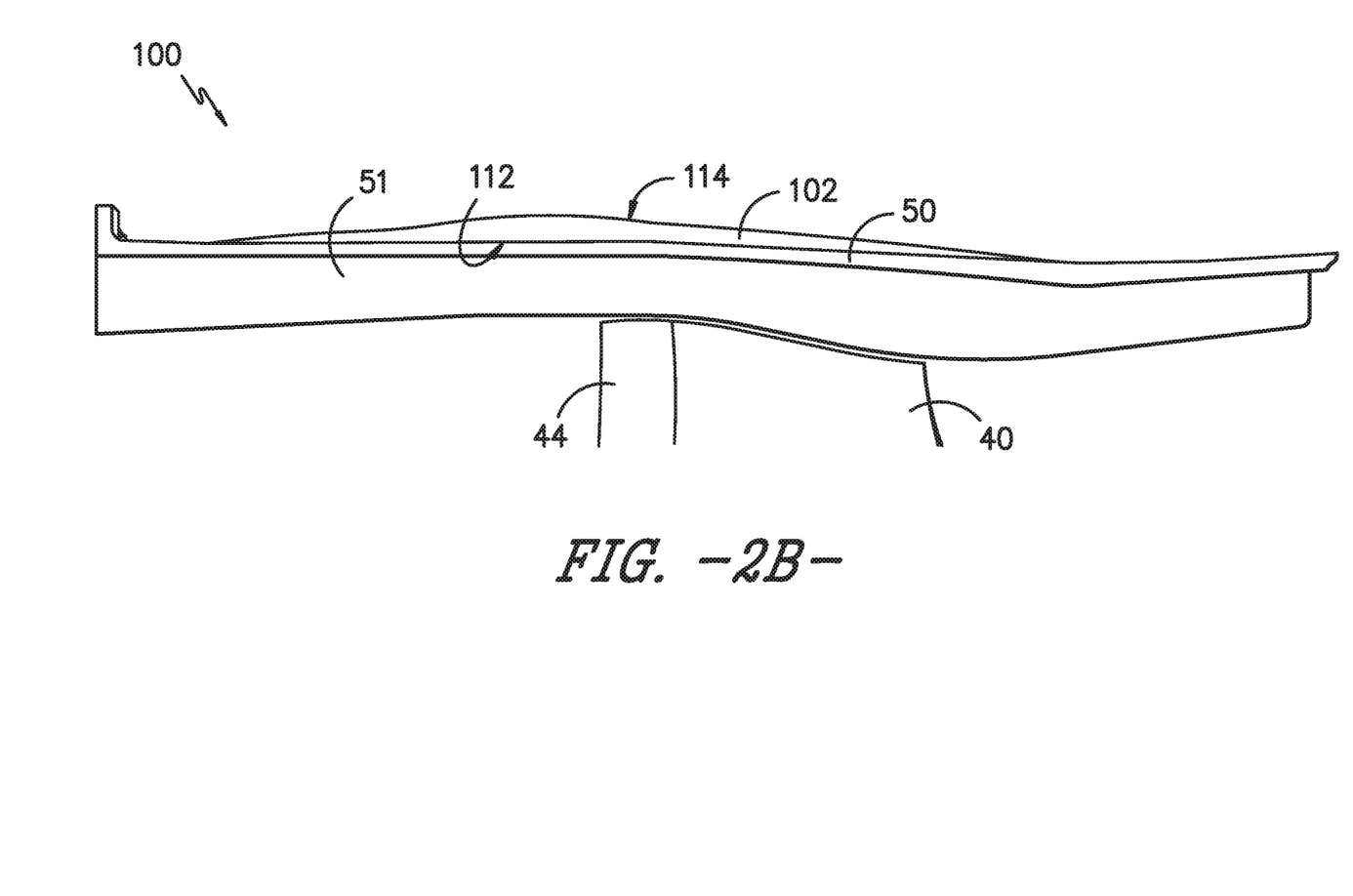
FIG. 2B provides a schematic cross-section view of a hardwall fan containment case assembly according to another exemplary embodiment of the present subject matter.

FIG. 2B illustrates another exemplary embodiment of a hardwall fan containment case assembly 100. As depicted, the fan containment case assembly 100 includes the fan case 50, which is disposed about the longitudinal centerline 12 (FIG. 1), and may include panels 51 on the interior of the fan case 50 that improve acoustic and blade rub characteristics. Additionally, an outer layer 102 of composite material is applied over at least a portion of the outer surface of the fan case 50. As previously described, the fan case 50 is the shell of the hardwall containment system and may be formed from a metallic material, and the outer layer 102 may be considered extra shell material, e.g., composite material, such as a PMC material, applied to the outer surface of the fan case 50. In such embodiments, the outer layer 102 forms a radially outermost portion of the fan containment case assembly 100, helping contain objects travelling outward from within the panels 51 from continuing to travel beyond the fan section 14. The fan case 50 and composite outer layer 102 may be referred to as the containment case of the fan containment case assembly 100.

Figure 3:
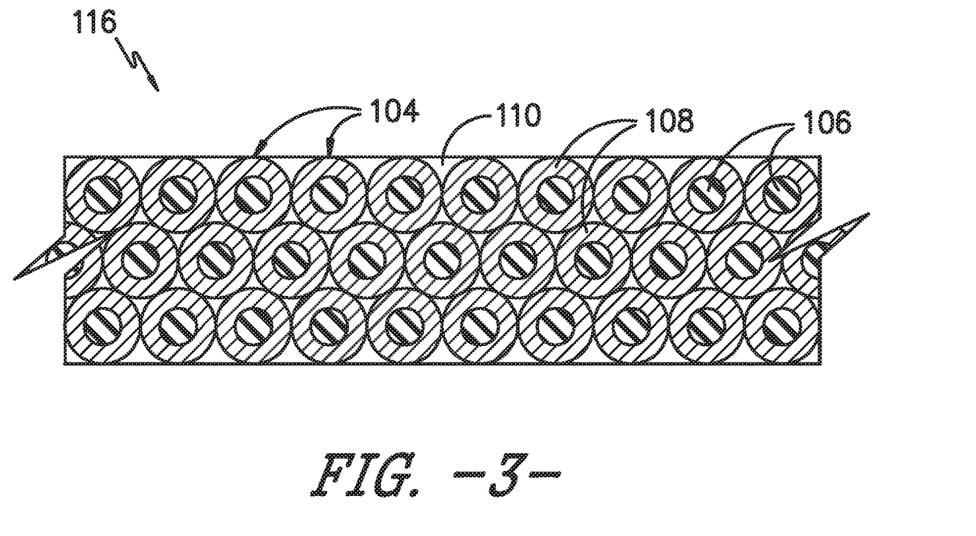
FIG. 3 provides a schematic cross-section view of a portion of a composite fan case of the fan containment case assembly of FIG. 2A, having a plurality of coated fibers formed in a polymer matrix composite ply used to construct the composite fan case, or a portion of a composite outer layer of the fan containment case assembly of FIG. 2B, having a plurality of coated fibers formed in a polymer matrix composite ply used to construct the composite outer layer, according to an exemplary embodiment of the present subject matter.

As illustrated in FIG. 3, the fan case 50 (or containment case 50) of FIG. 2A or the outer layer 102 of FIG. 2B comprises a plurality of coated fibers 104. Each coated fiber comprises a fiber 106 surrounded by a ceramic material 108 such that the ceramic material coats the fiber 106. As previously described, the fan case 50 or the outer layer 102 of a hardwall fan containment case assembly 100 may be formed from a PMC material having carbon (e.g., graphite) fibers 106 embedded in a resin (e.g., epoxy) matrix material 110, i.e., each fiber 106 is a carbon fiber such as a graphite fiber and the carbon fibers 106 are impregnated with a resin matrix material 110 such as epoxy to form the PMC material. Accordingly, in the exemplary embodiment described herein, the carbon fibers 106 are each coated with the ceramic material 108 prior to infusing the fibers 106 with the epoxy resin 110.

In some embodiments, the ceramic material 108 is chosen from a group consisting of tungsten carbide (WC), aluminum oxide ($Al_2O_3$), and titanium dioxide ($TiO_2$). Other suitable ceramic materials 108 may be used as well. By coating the carbon fibers 106 with the ceramic material 108 prior to infusing the fibers 106 with the epoxy resin 110, the shear strength of a composite fan case 50 or composite outer layer 102 can be increased, thereby increasing the ability of the composite fan case 50 or outer layer 102 to resist cutting or the like by sharp objects, such as the metal leading edge 44 (FIGS. 2A, 2B) of a fan blade 40, etc.

The composite fan case 50 or the composite outer layer 102 may comprise both the plurality of coated fibers 104, as well as a plurality of uncoated fibers 106. That is, the uncoated fibers are the fibers 106 described above without the surrounding ceramic material 108. The plurality of coated fibers 104 is a first volume fraction of the composite fan case 50 or outer layer 102, and the plurality of uncoated fibers 106 is a second volume fraction of the composite fan case 50 or outer layer 102. Where the combination of coated fibers 104 and uncoated fibers 106 is impregnated with a matrix material, such as an epoxy resin, the matrix material is a third, remaining volume fraction of the composite fan case 50 or outer layer 102. That is, together the first volume fraction, the second volume fraction, and the third volume fraction form the total volume of the fan case 50 or outer layer 102. In exemplary embodiments, the first volume fraction is greater than 50%, and more particularly, the first volume fraction is greater than 80%. As examples, in one embodiment, the first volume fraction is approximately 55%, and in another embodiment, the first volume fraction is approximately 95%.

Further, in some embodiments, the first volume fraction and second volume fraction may vary throughout the fan containment case assembly 100, e.g., the first volume fraction and second volume fraction may vary circumferentially, axially, and/or radially. For instance, the composite fan case 50 or outer layer 102 may be referred to as a functionally graded material (FGM), where the composition and/or structure of the composite fan case 50 or outer layer 102 is gradually varied over its volume, resulting in corresponding changes in the properties of the composite fan case 50 or outer layer 102. Because individual fibers 106 are coated with the ceramic material 108 to form coated fibers 104, a ratio of coated fibers 104 to uncoated fibers 106 forming the composite fan case 50 or outer layer 102 can be optimized. As such, a functionally graded fan containment case assembly 100 can be produced, having increased shear strength at certain locations, e.g., at a leading edge impact zone or a root impact zone or at an inner surface of the composite fan case 50 or outer layer 102. Further, where the coated fibers 104 and uncoated fibers 106 are formed into plies 116 to construct the composite fan case 50 or outer layer 102, having a graded fraction of the coated fibers 104 in each ply 116 allows the design to be optimized to minimize weight of the fan containment case assembly 100.

More particularly, the composite fan case 50 or outer layer 102 may be segmented into circumferential zones, axial zones, and/or radial zones, and the volume fraction of coated fibers 104 (i.e., the first volume fraction) may be greater in one or more such zones that in other such zones. As an example, through testing, analysis of FBO events, etc., a plurality of zones that are circumferentially spaced apart from one another may be identified as having a greater potential for impact by an object than a remainder of the fan case 50. The volume fraction of coated fibers 104 (i.e., the first volume fraction) within the composite fan case 50 or outer layer 102 at the plurality of circumferential zones is greater than the first volume fraction at least at circumferential locations between the plurality of circumferential zones. For instance, the first volume fraction may be 95% or greater in the plurality of circumferential zones and 5% or less in the remainder of the composite fan case 50 or outer layer 102.

As another example, the volume fraction of coated fibers 104 may vary radially, e.g., the first volume fraction may taper from an inner portion of the composite fan case 50 or outer layer 102 to an outer portion of the composite fan case 50 or outer layer 102. In an exemplary embodiment, the composite fan case 50 of FIG. 2A includes a greater proportion of the coated fibers 104 at an inner surface 112 of the composite fan case 50 than at a location within the composite fan case 50 that is radially outward from the inner surface 112. For instance, the proportion of coated fibers 104 within the composite fan case 50 may decrease from the inner surface 112 to an outer surface 114 of the fan case 50. Similarly, the proportion of coated fibers 104 within the composite outer layer 102 of FIG. 2B may decrease from the inner surface 112 to an outer surface 114 of the outer layer 102. As yet another example, the volume fraction of coated fibers 104 may vary axially, e.g., the first volume fraction may be greater at one or more axial locations of the composite fan case 50 or outer layer 102 than at the remaining axial locations along the composite fan case 50 or outer layer 102. Thus, the volume fraction of coated fibers 104 may be varied through the composite fan case 50 or outer layer 102 to optimize the characteristics of the fan case 50, i.e., not every fiber throughout the composite fan case 50 or outer layer 102 need be coated with the ceramic material 108 to sufficiently increase the ability of the fan containment case assembly 100 to resist cutting, piercing, or other such damage by objects impacting the assembly 100.

The coated fibers 104, and in some embodiments, the coated fibers 104 and uncoated fibers 106, may be manipulated into any common form to fashion the composite fan case 50 or outer layer 102. For instance, the plurality of coated fibers 104, or the plurality of coated fibers 104 and the plurality of uncoated fibers 106, may be woven into a textile (e.g., formed as a fabric), braided, stitched, or manipulated into a three-dimensional weave to form the composite fan case 50 or outer layer 102. It will be appreciated that any suitable common form for PMC and/or CMC materials may be used to form the fan case 50 from the coated fibers 104, or the coated fibers 104 and uncoated fibers 106.

Figure 4:
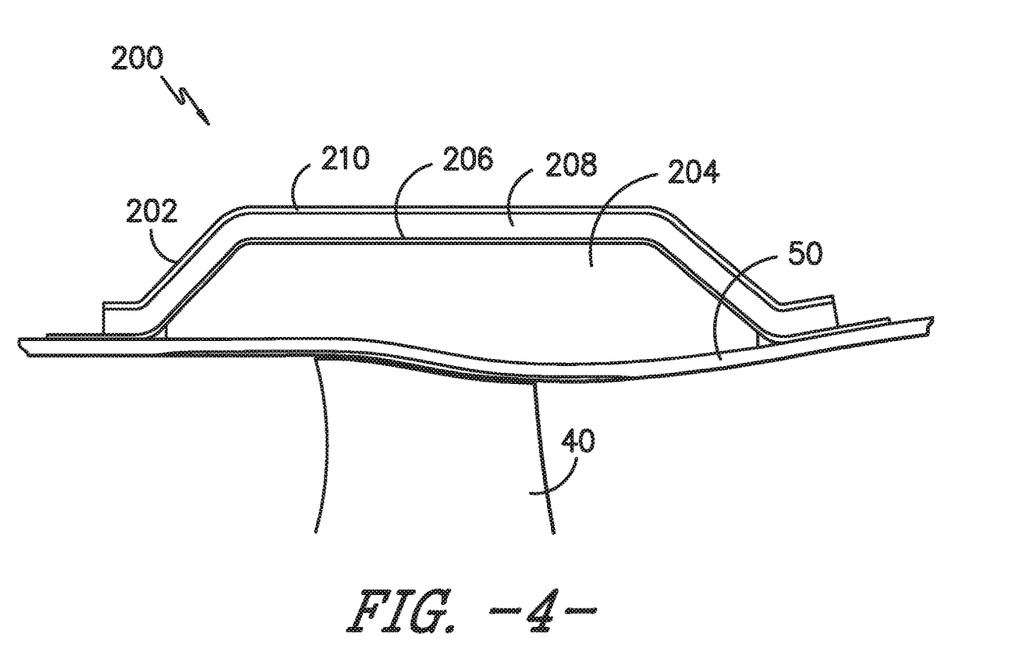
FIG. 4 provides a schematic cross-section view of a softwall fan containment case assembly according to an exemplary embodiment of the present subject matter.
Figure 5:
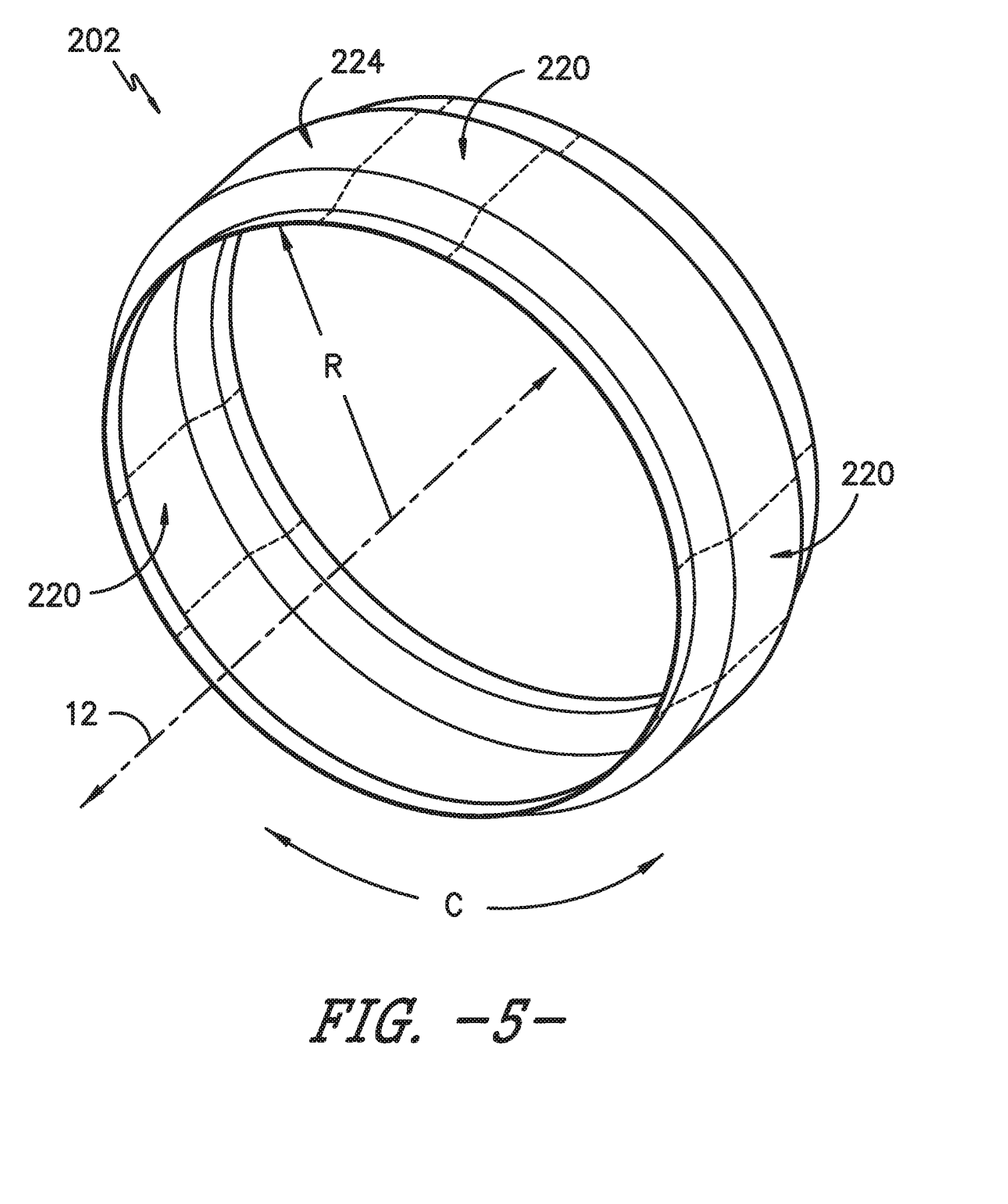
FIG. 5 provides a perspective view of the fan containment case assembly of FIG. 4.
Figure 6:
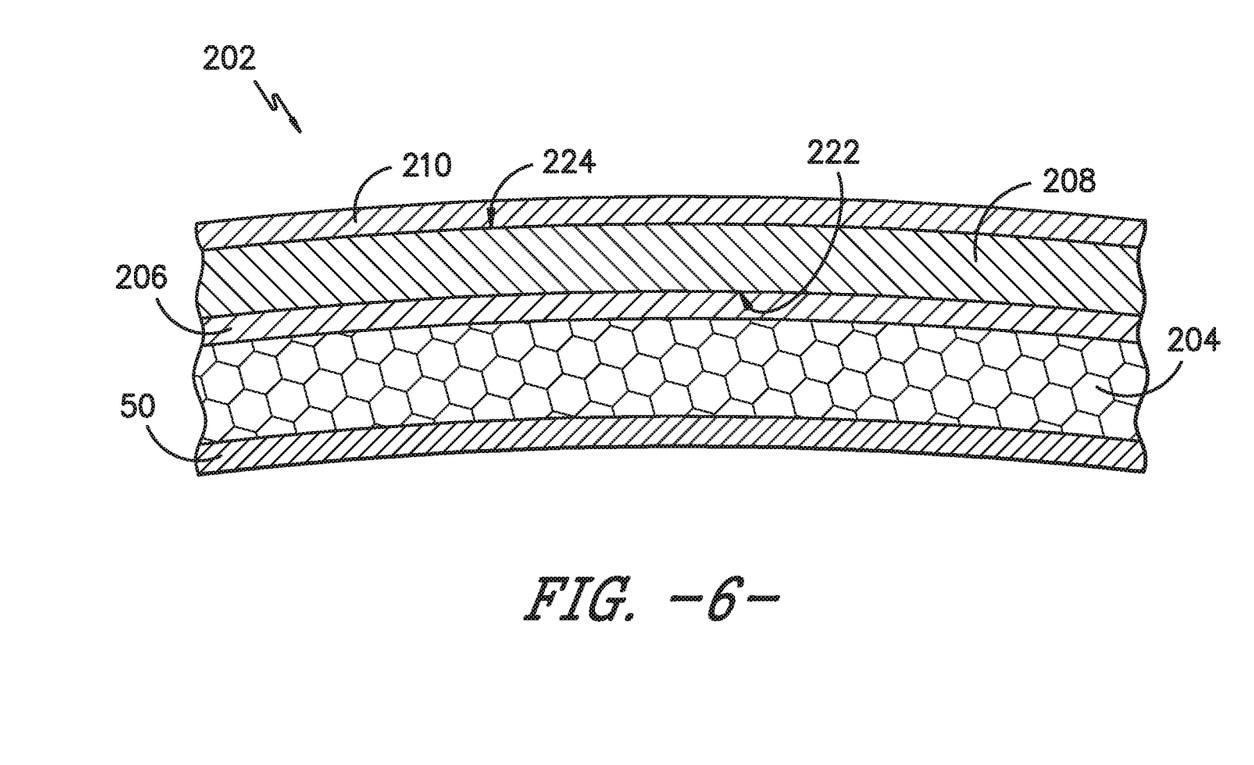
FIG. 6 provides a schematic cross-section view of the fan containment case assembly of FIG. 4.

Turning now to FIGS. 4-7, a softwall fan containment case assembly 200 is illustrated according to an exemplary embodiment of the present subject matter. As shown in FIG. 4, the fan containment case assembly 200 includes the fan case 50 and a containment case 202 surrounding the fan case 50. Referring particularly to FIGS. 5 and 6, like the fan case 50, the containment case 202 is annular and is disposed about the longitudinal centerline 12. Further, in the depicted embodiment, the containment case 202 has an annular filler layer 204 disposed radially outward from the fan case 50. An annular back sheet 206 is disposed radially outward from the filler layer 204 such that the filler layer 204 is sandwiched between the fan case 50 and the back sheet 206. The filler layer 204 typically is a honeycomb layer, but other suitable types and configurations of filler materials may be used as well. In some embodiments, the filler layer 204 and back sheet 206 may each be configured to carry a portion of the load on the fan containment case assembly 200. In such embodiments, the fan case 50 may be referred to as the fan case inner shell and the back sheet 206 may be referred to as the fan case outer shell.

The containment case 202 may include other layers as well. More particularly, in the depicted exemplary embodiment, an annular containment belt 208 is disposed radially outward from the back sheet 206. An annular cover sheet 210 may be disposed radially outward from the containment belt 208, and the cover sheet 210 may cover and surround the containment belt 208. Thus, in embodiments including the cover sheet 210, the cover sheet 210 forms a radially outermost portion of the containment case 202 and containment system 200, but the containment belt 208 also is an outer layer of the containment case 202. As described in greater detail herein, the containment belt 208 may surround the inner fan case 50 to contain objects travelling outward from within the inner fan case from travelling beyond the fan section 14, while the cover sheet 210 generally may provide environmental protection to the containment belt 208 and the remainder of the containment case 202. Therefore, the containment belt 208 also may be referred to as a containment layer.

In exemplary embodiments, the fan containment case assembly 200 includes at least one composite wall, e.g., the back sheet 206 may be a composite back sheet and the cover sheet 210 may be a composite cover sheet. The composite material of the composite wall(s) of the fan containment case assembly 200 preferably is a lightweight and high-strength material, such as PMC or CMC material. In some embodiments, the fan case 50 is a metallic inner wall of the fan containment case assembly 200, i.e., the fan case 50 is formed from a metal or metal alloy. However, in other embodiments the fan case 50 is a composite inner wall of the containment system 200, formed from a composite material such as a PMC, CMC, or the like.

Figure 7:
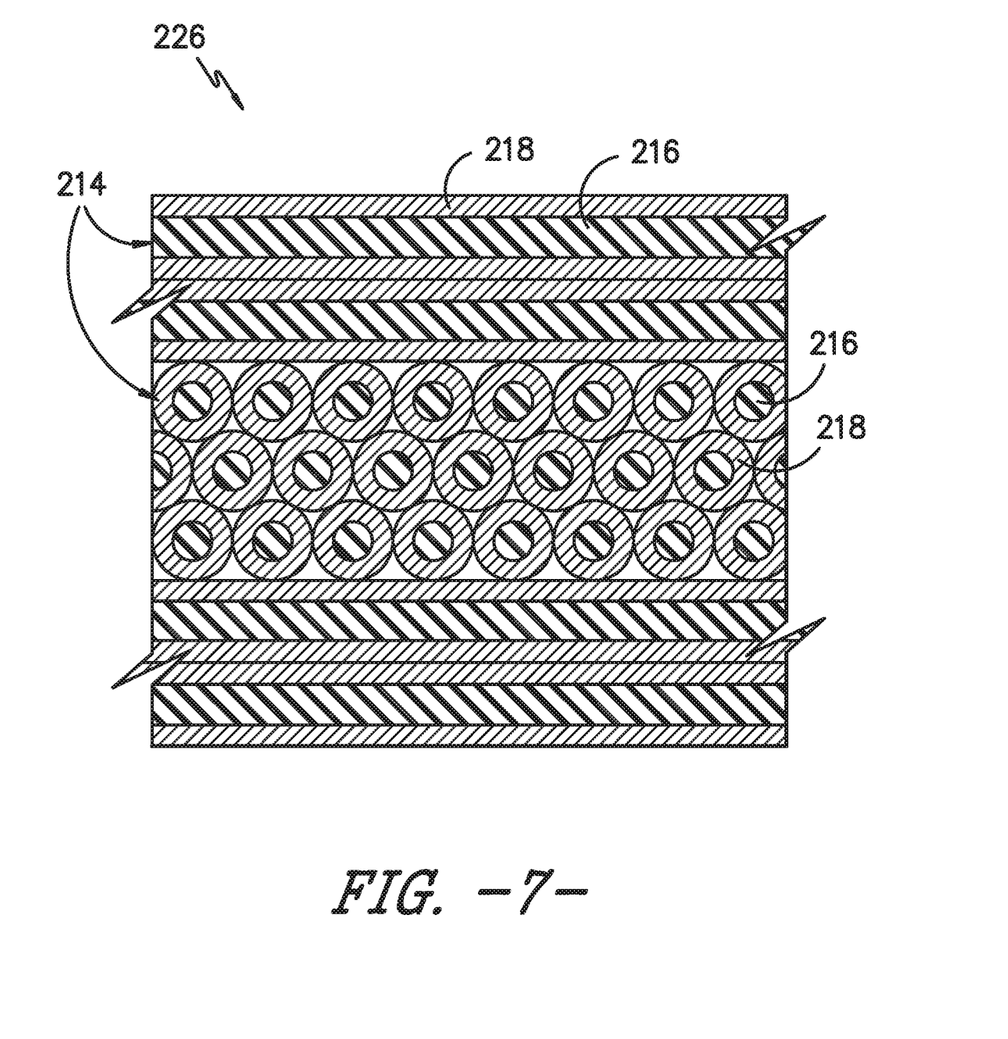
FIG. 7 provides a schematic cross-section view of a portion of a containment belt of the fan containment case assembly of FIG. 4, having a plurality of coated fibers formed in a woven textile used to construct the containment belt according to an exemplary embodiment of the present subject matter.

Similar to the composite fan case 50 or outer layer 102 of the hardwall fan containment case assembly 100, the containment belt 208 (or containment layer 208) includes a plurality of coated fibers 214, as shown in FIG. 7. Although primarily described herein as used in the containment belt 208, it will be appreciated that the coated fibers 214 may be used in any composite layer of the fan containment case assembly 200, e.g., in a composite back sheet 206 or in a composite fan case 50. Each coated fiber 214 comprises a fiber 216 surrounded by a ceramic material 218 such that the ceramic material coats the fiber 216. As previously described, the containment belt or layer 208 of a softwall fan containment case assembly 100 may be formed from aromatic polyamide fibers (e.g., Kevlar®). Accordingly, in the exemplary embodiment described herein, the aromatic polyamide fibers 216 are each coated with the ceramic material 218. Like the composite fan case 50 or outer layer 102 described with respect to FIGS. 2A, 3B, and 3, the ceramic material 218 may chosen from a group consisting of tungsten carbide (WC), aluminum oxide ($Al_2O_3$), and titanium dioxide ($TiO_2$), but other suitable ceramic materials 218 may be used as well. The ceramic material 218 coating the fibers 216 increases the fibers' resistance to cutting by an object, thereby reducing shear and/or fraying damage of the containment belt 208 of the fan containment case assembly 200. Thus, the ceramic coated fibers 214 have improved shear strength compared to the uncoated fibers 216.

In some embodiments, the containment belt 208 may comprise both the plurality of coated fibers 214, as well as a plurality of uncoated fibers 216. That is, the uncoated fibers are the fibers 216 described above without the surrounding ceramic material 218. The plurality of coated fibers 214 is a first volume fraction of the containment belt 208, and the plurality of uncoated fibers 216 is a second volume fraction of the containment belt 208. Where the combination of coated fibers 214 and uncoated fibers 216 is impregnated with a matrix material, the matrix material is a third, remaining volume fraction of the containment belt 208, i.e., the sum of the first, second, and third volume fractions equals 100% or the total volume of the containment belt 208 or containment layer material. However, if the coated fibers 214 and uncoated fibers 216 are used "dry," e.g., as woven together as a fabric and not infused with matrix material, the first volume fraction and the second volume fraction together are the total volume of the containment belt 208 or containment layer material. In exemplary embodiments of either matrix infused or dry fibers, the first volume fraction is greater than 50%, and more particularly, the first volume fraction is greater than 80%. As examples, in one embodiment, the first volume fraction is approximately 55%, and in another embodiment, the first volume fraction is approximately 95%.

Further, as described above with respect to the fan containment case assembly 200, in some embodiments, the first volume fraction and second volume fraction may vary throughout the fan containment case assembly 200, e.g., the first volume fraction and second volume fraction may vary circumferentially, axially, and/or radially. As described in more detail herein with respect to the composite fan case 50 and outer layer 102, the containment belt 208 may be a functionally graded material (FGM), with the proportion of coated fibers 214 varying between circumferential, axial, and/or radial locations along the fan containment case assembly 200. The ratio of coated fibers 214 within the containment belt 208 can be optimized because individual fibers 216 are coated with the ceramic material 218 to form coated fibers 214, such that a number of coated fibers 214 at any particular location can be selected based on the likely object impacts at that particular location. For example, more coated fibers 214 may be included in the containment belt 208 at a leading edge impact zone or a root impact zone, or the volume fraction of the coated fibers 214 may be greatest at an innermost portion of the containment belt 208, tapering to a smaller volume fraction at locations radially outward from the innermost portion of the containment belt 208. Moreover, where the coated fibers 214 and uncoated fibers 216 are formed into plies 226 (FIG. 7) to construct the containment belt 208, having a graded fraction of the coated fibers 214 in each ply 226 allows the design to be optimized to minimize weight of the fan containment case assembly 200.

It will be appreciated that the examples of containment cases or containment layers having radial, axial, and circumferential zones of increased coated fibers 214 described with respect to composite fan case 50 and outer layer 102 also are applicable to containment belt 208. For example, referring to FIG. 5, a plurality of zones 220 that are circumferentially spaced apart from one another may be identified as having a greater potential for impact by an object than a remainder of the containment belt 208. The volume fraction of coated fibers 214 (i.e., the first volume fraction) within the containment belt 208 at the plurality of circumferential zones 220 is greater than the first volume fraction at least at circumferential locations between the plurality of circumferential zones 220. For instance, the first volume fraction may be 95% or greater in the plurality of circumferential zones 220 and 5% or less in the remainder of the containment belt 208. As another example, described in greater detail with respect to composite fan case 50 and outer layer 102, an exemplary embodiment of the containment belt 208 includes a greater proportion of the coated fibers 214 at an inner surface 222 of the containment belt 208 than at a location within the containment belt 208 that is radially outward from the inner surface 222. For example, the proportion of coated fibers 214 within the containment belt 208 may decrease from the inner surface 222 to an outer surface 224 of the containment belt 208. Thus, the volume fraction of coated fibers 214 may be varied through the containment belt 208 to optimize the characteristics of the containment belt 208, i.e., not every fiber throughout the containment belt 208 need be coated with the ceramic material 218 to sufficiently increase the ability of the fan containment case assembly 200 to resist cutting, piercing, or other such damage by objects impacting the system 200.

The coated fibers 214, and in some embodiments, the coated fibers 214 and uncoated fibers 216, may be manipulated into any common form to fashion the containment belt 208. For instance, the plurality of coated fibers 214, or the plurality of coated fibers 214 and the plurality of uncoated fibers 216, may be woven into a textile (e.g., formed as a fabric), braided, stitched, or manipulated into a three-dimensional weave to form the containment belt 208. It will be appreciated that any suitable common form for PMC and/or CMC materials may be used to form the containment belt 208 from the coated fibers 214, or the coated fibers 214 and uncoated fibers 216.

In some embodiments, the fan containment case assembly 100, 200 also includes the inlet 60 of the fan section 14. As previously described, the inlet 60 is upstream of the fan case 50. As such, the inlet 60 may be formed separately from the fan case 50 and comprise a second plurality of the coated fibers 104, 214. By incorporating the coated fibers 104, 214 in the inlet 60, the inlet 60 would also benefit from improved fragment cutting resistance. Thus, the cutting resistance of the entire fan section 14 can be improved by incorporating the coated fibers 104, 214 into the containment case, e.g., the composite fan case 50 or outer layer 102 of a hardwall assembly 100 and the containment belt or layer 208 of a softwall assembly 200, as well as the inlet 60.

Figure 8:
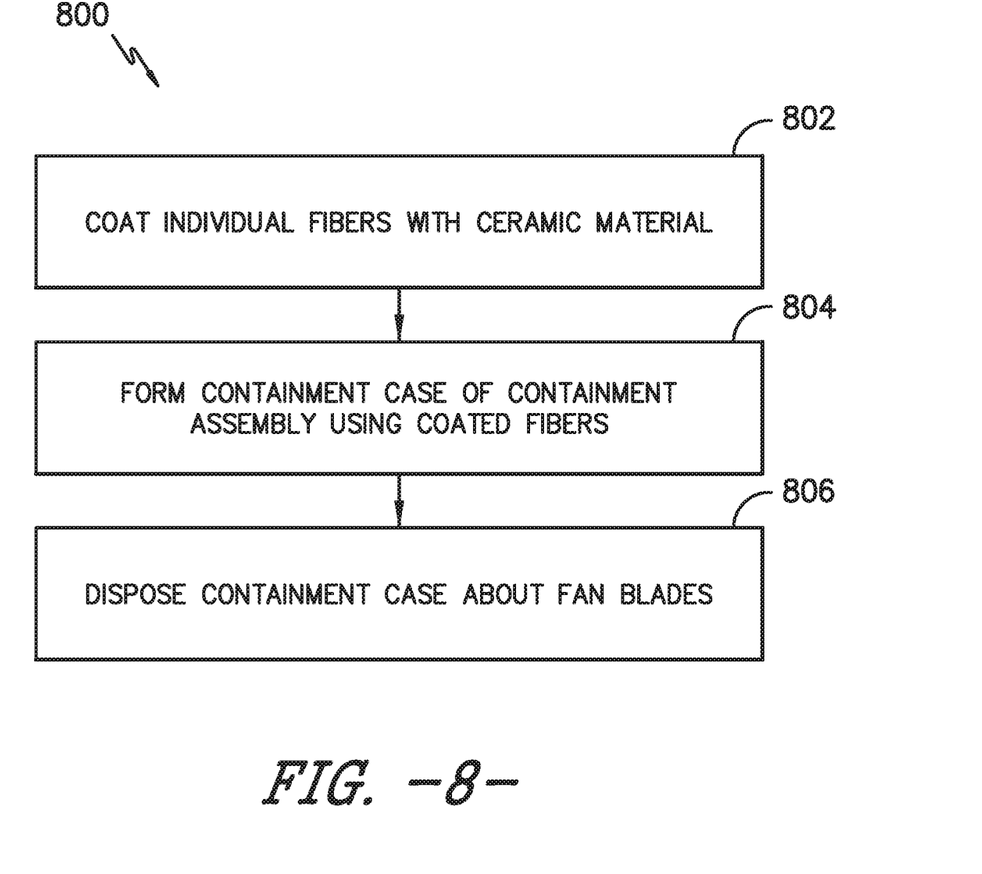
FIG. 8 provides a flow diagram illustrating a method for forming a containment assembly of a gas turbine engine.

Turning now to FIG. 8, a flow diagram is provided illustrating an exemplary method 800 for forming a containment system for a gas turbine engine, such as a fan containment case assembly 100 or fan containment case assembly 200 of turbofan engine 10. As shown at 802, the exemplary method 800 includes coating each fiber 106, 216 or a plurality of fibers 106, 216 with a ceramic material 108, 218 such that the ceramic material 108, 218 surrounds each fiber 106, 216 of the plurality of fibers 106, 216 to form a plurality of coated fibers 104, 214. Next, as shown at 804 in FIG. 8, the method 800 includes forming a containment case of the containment system 100, 200 using the plurality of coated fibers 104, 214. It will be understood that the containment case is the composite fan case 50 or fan case 50 and composite outer layer 102 in a hardwall containment assembly 100 and that, in a softwall containment assembly 200, the containment case includes the containment belt or containment layer 208.

Forming the containment case may comprise steps similar to those used in forming a composite material, such as a PMC material. As one example, coated fibers 104 and uncoated fibers 106 may be impregnated with matrix material 110, and the resulting composition cut into plies of the composite material. Forming the containment case, or at least a portion of the containment case such as in softwall containment assemblies (where the containment case may comprise several layers and not all layers may be formed from a composite material), may then include laying up a plurality of the composite plies, layer by layer, building a ply layup. It will be understood that the ply layup may be formed by laying up the composite plies on a tool, mandrel, or other support. Then, the ply layup may undergo thermal and/or chemical processing to form the containment case (or layer of the containment case). For example, for a PMC hardwall containment case, the composite ply layup is debulked and consolidated, e.g., at elevated temperatures and pressures in an autoclave, and undergoes densification and final curing. Specific processing techniques and parameters for the thermal and/or chemical processing of the ply layup will depend on the particular composition of the materials used to form the plies. As an example, other known methods or techniques for curing composite plies may be utilized. Further, as described herein, the coated fibers 104, 214 may be disposed at one or more particular locations in the containment case in a greater proportion or concentration that at other locations in the containment case.

Additionally, the ceramic coated fibers 104, 214, as well as the uncoated fibers 106, 216 where the containment case (or at least a portion of the containment case, as in softwall containment assemblies) is formed from both coated and uncoated fibers, may be formed as plies of balanced two-dimensional (2D) woven cloth comprising the coated fibers 104, 214 (or both coated fibers 104, 214 and uncoated fibers 106, 216), having two weave directions at substantially 90° angles to each other, as shown in FIG. 7 with coated fibers 214. In such embodiments, substantially the same number of fibers may be running in both directions of the weave. In still other embodiments, 2D, 2.5D, and/or 3D plies or preforms may be formed using the ceramic coated fibers 104, 214, either alone or in combination with uncoated fibers 106, 216. For example, cut layers of 2D woven fabrics may be stacked in alternating weave directions as described above, or filaments may be wound or braided and combined with 3D weaving, stitching, or needling to form 2.5D or 3D preforms having multiaxial fiber architectures. Other ways of forming 2.5D or 3D preforms, e.g., using other weaving or braiding methods or utilizing 2D fabrics, as well as stitching and other ways of forming plies or preforms may be used as well.

For softwall fan containment case assemblies 200, after or while the layer(s) of the containment case that include coated fibers 214, such as containment belt or layer 208, are being formed, the additional components of the fan containment case assembly 200 may be formed or prepared. For instance, a fan case 50 may be formed from a metallic or composite material, a filler layer 204 (such as honeycomb) may be prepared from a suitable material, and each of a back sheet 206 and cover sheet 210 may be formed or prepared, e.g., from a composite material such as a PMC or CMC material or another suitable material.

After the containment case is formed, as well as any additional components of the fan containment case assembly 100, 200, such as the fan case 50 of the containment assembly 200, the components of the fan containment case assembly 100, 200 may be assembled to form the containment system 100, 200. In particular, as shown at 806 in FIG. 8, the method 800 includes disposing the containment case about the fan blades 40. For example, for hardwall containment assemblies 100, the containment case, i.e., the composite fan case 50 or fan case 50 and outer layer 102, is disposed about the panel(s) 51 radially outward from the fan blades 40, and for softwall containment assemblies 200, the containment case including a containment layer such as containment belt 208 is disposed radially outward from the fan blades 40.

Accordingly, the present subject matter is directed to utilizing coated fibers to improve individual fiber shear strength, e.g., to improve blade containment in a fan blade-out event. More particularly, the present subject matter provides fan containment case assemblies, and methods for forming such assemblies, that utilize ceramic coated fibers to improve the resistance of the fibers to cutting or shearing and thereby improve containment of blades or blade fragments within the containment assembly. Coating the fibers in at least a portion of the containment assembly with a ceramic material can provide shear strength and reduce the ability of a sharp fragment or blade to cut the main load carrying fibers.

In some embodiments, plies are formed using the individually coated fibers, and the plies are used to construct the containment case of the containment assembly, such as a fan case of a hardwall containment assembly or a containment belt or containment layer of a softwall containment assembly. A graded fraction of coated fibers in each ply allows optimization of the containment case to minimize engine weight while improving containment. For instance, a volume fraction of the coated fibers in each ply or layer forming the containment case can be optimized for blade containment. Similarly, the coated fibers can be locally employed in specific zones of the containment assembly to locally improve containment and to optimize the ratio of coated and uncoated fibers. For example, the containment case can be radially graded to optimize the ratio of coated to uncoated fibers from an inner surface of the containment case, or a layer of the containment case, to an outer surface of the containment case, or a layer of the containment case. Further, the coated fibers may be used in large open weave architectures, as well as any usual ply forms, such as 2D, 2.5D, and 3D weaves; braided architectures; stitched architectures; and the like.

Moreover, the present subject matter employs fibers that have been individually coated in a ceramic material, which allows each fiber to reach its intrinsic fiber strength by reducing or eliminating the cutting failure mode. By incorporating the ceramic into each individual fiber, the increased shear capability of the fibers can be fully integrated into the fan containment case assembly constructed using the coated fibers, rather than be relegated to a separate, non-integrated zone of material. Fully integrating the ceramic material via coated fibers prevents the shear barrier from being displaced during an event, which could occur if the ceramic was separate. More specifically, separate layers of ceramic cloth have a tendency to bunch up, ball up, or become separated from the main containment system, rendering the shear barrier ineffectual. Further, a separate shear barrier creates an additional step in the manufacturing process; utilizing ceramic coated fibers allows the ceramic material to be fully integrated during manufacturing without additional steps.

Additionally, the present subject matter reduces cutting or shear failure without increased cost and weight. For instance, the weight of hardwall and softwall containment assemblies may be reduced by approximately 100 pounds (100 lbs) for a fan case having a diameter of 132 inches (132"). Further, increased shear resistance is provided using less material, which reduces manufacturing cost. That is, the fan case or other containment features need not have an increased thickness to increase shear resistance; rather, as described, the increased shear resistance is integrated into the containment assembly design by coating at least a portion of the fibers that would typically be used to form a containment assembly.

What is more, the present subject matter provides improved nesting of a released blade within the containment assembly, as well as an improved ability to predict nesting of a released blade. Moreover, the present subject matter provides reduced stretch of the containment assembly, which allows lower or reduced diameter of the nacelle surrounding the containment assembly on softwall cases. That is, by resisting cutting or shearing, a softwall containment assembly according to the present subject matter does not stretch as much upon impact by a blade or blade fragment as known assemblies, thereby reducing the probability that the containment assembly will contact the nacelle and allowing a smaller nacelle diameter (i.e., tighter tolerance between the containment system and the nacelle). Further, the present subject matter provides improved tolerance to forward travelling fragments in the fan inlet. Other advantages of the subject matter described herein also may be realized by those of ordinary skill in the art.

Further aspects of the invention are provided by the subject matter of the following clauses:

1. A containment assembly of a gas turbine engine comprising a containment case including a plurality of coated fibers, wherein each coated fiber comprises a fiber surrounded by a ceramic material such that the ceramic material coats the fiber.

2. The containment assembly of any preceding clause, wherein the containment case is disposed about a longitudinal centerline of the gas turbine engine.

3. The containment assembly of any preceding clause, further comprising a plurality of uncoated fibers, wherein the plurality of coated fibers is a first volume fraction of the containment case and the plurality of uncoated fibers is a second volume fraction of the containment case.

4. The containment assembly of any preceding clause, wherein the first volume fraction is greater than 50%.

5. The containment assembly of any preceding clause, wherein the first volume fraction is greater than 80%.

6. The containment assembly of any preceding clause, wherein the first volume fraction varies circumferentially within the containment assembly.

7. The containment assembly of any preceding clause, wherein the first volume fraction varies axially within the containment assembly.

8. The containment assembly of any preceding clause, wherein the first volume fraction varies radially within the containment assembly.

9. The containment assembly of any preceding clause, wherein the plurality of coated fibers are woven into a textile, braided, stitched, or manipulated into a three-dimensional weave to form at least a portion of the containment case.

10. The containment assembly of any preceding clause, wherein the ceramic material is chosen from a group consisting of tungsten carbide, aluminum oxide, and titanium dioxide.

11. The containment assembly of any preceding clause, wherein each fiber is a graphite fiber.

12. The containment assembly of any preceding clause, wherein the plurality of coated fibers are infused with a resin matrix material.

13. The containment assembly of any preceding clause, wherein each fiber is an aromatic polyamide fiber.

14. The containment assembly of any preceding clause, wherein the containment case comprises an annular inner shell; a filler layer disposed radially outward from the annular inner shell; an annular outer shell disposed radially outward from the filler layer; and a containment belt disposed radially outward from the annular outer shell, wherein the containment belt comprises the plurality of coated fibers.

15. A containment assembly of a gas turbine engine comprising an inner case and a containment case comprising a plurality of coated fibers, each coated fiber comprising a fiber surrounded by a ceramic material such that the ceramic material coats the fiber, wherein the containment case includes a greater proportion of the coated fibers at an inner surface of a layer of the containment case than at a location within the containment case that is radially outward from the inner surface.

16. The containment assembly of any preceding clause, wherein the proportion of the coated fibers within the containment case decreases from the inner surface to an outer surface of the layer.

17. The containment assembly of any preceding clause, wherein the inner case is a fan case of the gas turbine engine.

18. The containment assembly of any preceding clause, further comprising an inlet of a fan of the gas turbine engine, the inlet upstream of the fan case, wherein the inlet comprises a second plurality of the coated fibers.

19. The containment assembly of any preceding clause, wherein the layer is a radially outer layer of the containment case, and wherein the containment case surrounds the inner case to contain objects travelling outward from the inner case.

20. A method for forming a containment assembly of a gas turbine engine comprising coating each fiber of a plurality of fibers with a ceramic material such that the ceramic material surrounds each fiber of the plurality of fibers to form a plurality of coated fibers; forming a containment case using the plurality of coated fibers; and disposing the containment case about a plurality of fan blades of the gas turbine engine.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A containment assembly of a gas turbine engine, comprising:
    a containment case including a plurality of coated fibers and a plurality of uncoated fibers,
    wherein each coated fiber comprises a fiber surrounded by a ceramic material such that the ceramic material coats the fiber,
    wherein the plurality of coated fibers is a first volume fraction of the containment case and the plurality of uncoated fibers is a second volume fraction of the containment case, and
    wherein the first volume fraction is greater than 50%.

2. The containment assembly of claim 1, wherein the containment case is disposed about a longitudinal centerline of the gas turbine engine.

3. The containment assembly of claim 1, wherein the first volume fraction is greater than 80%.

4. The containment assembly of claim 1, wherein the first volume fraction varies circumferentially within the containment assembly.

5. The containment assembly of claim 1, wherein the first volume fraction varies axially within the containment assembly.

6. The containment assembly of claim 1, wherein the first volume fraction varies radially within the containment assembly.

7. The containment assembly of claim 1, wherein the plurality of coated fibers are woven into a textile, braided, stitched, or manipulated into a three-dimensional weave to form at least a portion of the containment case.

8. The containment assembly of claim 1, wherein the ceramic material is chosen from a group consisting of tungsten carbide, aluminum oxide, and titanium dioxide.

9. The containment assembly of claim 1, wherein each fiber is a graphite fiber.

10. The containment assembly of claim 9, wherein the plurality of coated fibers are infused with a resin matrix material.

11. The containment assembly of claim 1, wherein each fiber is an aromatic polyamide fiber.

12. The containment assembly of claim 1, wherein the containment case comprises:
    an annular inner shell;
    a filler layer disposed radially outward from the annular inner shell;
    an annular outer shell disposed radially outward from the filler layer; and
    a containment belt disposed radially outward from the annular outer shell,
    wherein the containment belt comprises the plurality of coated fibers.

13. A containment assembly of a gas turbine engine, comprising:
    an inner case; and
    a containment case comprising a plurality of coated fibers, each coated fiber comprising a fiber surrounded by a ceramic material such that the ceramic material coats the fiber,
    wherein the containment case includes a greater proportion of the coated fibers at an inner surface of a layer of the containment case than at a location within the containment case that is radially outward from the inner surface.

14. The containment assembly of claim 13, wherein the proportion of the coated fibers within the containment case decreases from the inner surface to an outer surface of the layer.

15. The containment assembly of claim 13, wherein the inner case is a fan case of the gas turbine engine.

16. The containment assembly of claim 15, further comprising:
    an inlet of a fan of the gas turbine engine, the inlet upstream of the fan case,
    wherein the inlet comprises a second plurality of the coated fibers.

17. The containment assembly of claim 13, wherein the layer is a radially outer layer of the containment case, and wherein the containment case surrounds the inner case to contain objects travelling outward from the inner case.

18. A method for forming a containment assembly of a gas turbine engine, comprising:
    coating each fiber of a plurality of fibers with a ceramic material such that the ceramic material surrounds each fiber of the plurality of fibers to form a plurality of coated fibers;
    forming a containment case using the plurality of coated fibers and a plurality of uncoated fibers; and
    disposing the containment case about a plurality of fan blades of the gas turbine engine,
    wherein the plurality of coated fibers is a first volume fraction of the containment case and the plurality of uncoated fibers is a second volume fraction of the containment case, and
    wherein the first volume fraction varies circumferentially within the containment assembly.

* * * * *